(12) United States Patent
Gross et al.

(10) Patent No.: US 12,217,213 B2
(45) Date of Patent: *Feb. 4, 2025

(54) SYSTEMS AND METHODS FOR ADAPTIVE ROUTE OPTIMIZATION FOR LEARNED TASK PLANNING

(71) Applicant: State Farm Mutual Automobile Insurance Company, Bloomington, IL (US)

(72) Inventors: Ryan Michael Gross, Normal, IL (US); Jody Ann Thoele, Bloomington, IL (US); Joseph Robert Brannan, Bloomington, IL (US); Eric R. Moore, Heyworth, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,420

(22) Filed: Sep. 14, 2023

(65) Prior Publication Data

US 2023/0419262 A1    Dec. 28, 2023

Related U.S. Application Data

(63) Continuation of application No. 17/127,441, filed on Dec. 18, 2020, now Pat. No. 11,797,931.

(Continued)

(51) Int. Cl.
*G06Q 10/10*    (2023.01)
*G01C 21/34*    (2006.01)
(Continued)

(52) U.S. Cl.
CPC ......... *G06Q 10/10* (2013.01); *G01C 21/3484* (2013.01); *G06F 16/245* (2019.01);
(Continued)

(58) Field of Classification Search
CPC .. G06Q 10/10; G06Q 10/047; G06Q 30/0205; G06Q 40/08; G06F 16/245; G06F 16/29; G01C 21/3484; G06N 20/00
(Continued)

(56) References Cited

U.S. PATENT DOCUMENTS 5,291,412 A    3/1994  Tamai et al.
6,944,536 B2   9/2005  Singleton
(Continued)

FOREIGN PATENT DOCUMENTS

CN    105651289 A    6/2016
CN    106952189 A    7/2017
(Continued)

*Primary Examiner* — Robert R Niquette
(74) *Attorney, Agent, or Firm* — Armstrong Teasdale LLP

(57) ABSTRACT

An adaptive mapping (AM) computing device having at least one processor in communication with at least one memory device is provided. The AM computing device may be configured to retrieve a plurality of tasks associated with a user, and retrieve geographic mapping data. The AM computing device may also generate a route model based upon the retrieved plurality of tasks and the retrieved geographic mapping data. The AM computing device may execute the route model to determine an optimal route, and transmit, to the user, an optimized travel plan based upon the optimal route.

20 Claims, 9 Drawing Sheets

Related U.S. Application Data

(60) Provisional application No. 62/972,866, filed on Feb. 11, 2020.

(51) Int. Cl.
  *G06F 16/245* (2019.01)
  *G06F 16/29* (2019.01)
  *G06Q 10/047* (2023.01)
  *G06Q 30/0204* (2023.01)
  *G06Q 40/08* (2012.01)
  *G06Q 50/14* (2012.01)
  *G06N 20/00* (2019.01)

(52) U.S. Cl.
  CPC ............ *G06F 16/29* (2019.01); *G06Q 10/047* (2013.01); *G06Q 30/0205* (2013.01); *G06Q 40/08* (2013.01); *G06Q 50/14* (2013.01); *G06N 20/00* (2019.01)

(58) Field of Classification Search
  USPC .......................................................... 705/4
  See application file for complete search history.

(56) References Cited

U.S. PATENT DOCUMENTS

| | | |
|---|---|---|
| 9,103,687 B1 | 8/2015 | Loo et al. |
| 9,311,271 B2 | 4/2016 | Wright |
| 9,633,487 B2 | 4/2017 | Wright |
| 9,650,042 B2 | 5/2017 | Sujan et al. |
| 9,911,087 B1 | 3/2018 | Henderson et al. |
| 10,101,164 B2 | 10/2018 | Thakur |
| 10,192,369 B2 | 1/2019 | Wright |
| 10,198,879 B2 | 2/2019 | Wright |
| 11,466,997 B1* | 10/2022 | Williams ............ G01C 21/3492 |
| 2014/0222330 A1* | 8/2014 | Kohlenberg ........ G01C 21/3484 |
| | | 701/425 |
| 2018/0216952 A1 | 8/2018 | Krumm et al. |
| 2018/0299282 A1 | 10/2018 | Cummins et al. |
| 2020/0034757 A1* | 1/2020 | Gupta .................. G06Q 10/047 |
| 2020/0284601 A1* | 9/2020 | Myers ................. G06F 16/2379 |
| 2020/0363220 A1 | 11/2020 | Simoudis ........... G06Q 30/0255 |
| 2021/0063173 A1* | 3/2021 | Cope ...................... G06Q 40/08 |
| 2022/0366509 A1* | 11/2022 | Brannan ................ G06Q 40/08 |
| 2023/0236033 A1* | 7/2023 | Simoudis ........... G01C 21/3423 |
| | | 701/425 |

FOREIGN PATENT DOCUMENTS

| | | |
|---|---|---|
| CN | 110033143 A | 7/2019 |
| EP | 3420313 A1 | 1/2019 |
| TW | 201724006 A | 7/2017 |
| TW | 201727563 A | 8/2017 |
| WO | 2017146790 A1 | 8/2017 |

* cited by examiner

SYSTEMS AND METHODS FOR ADAPTIVE ROUTE OPTIMIZATION FOR LEARNED TASK PLANNING

CROSS-REFERENCE TO RELATED APPLICATIONS

This application is a continuation application of U.S. patent application Ser. No. 17/127,441, filed Dec. 18, 2020, entitled "SYSTEMS AND METHODS FOR ADAPTIVE ROUTE OPTIMIZATION FOR LEARNED TASK PLANNING," which is claims priority to, and claims the benefits of, U.S. Provisional Patent Application Ser. No. 62/972,866, filed Feb. 11, 2020, entitled "SYSTEMS AND METHODS FOR ADAPTIVE ROUTE OPTIMIZATION FOR LEARNED TASK PLANNING," the contents of which are hereby incorporated by reference, in its entirety and for all purposes, herein.

FIELD OF THE DISCLOSURE

The present disclosure relates to optimizing travel paths based upon learned task scheduling, and, more particularly, to machine learning systems and methods for predicting and scheduling desired tasks and determining optimal routes for efficient travel based upon the scheduled tasks.

BACKGROUND

Social activities, running errands, and family events may often be very demanding on one's time. The number of activities and events that are available and/or required may be so numerous that planning may not be possible by mere memory recall. Some planning and scheduling systems and methods, such as calendar reminders, task lists, and project management methods may be cumbersome and difficult to use. For example, a wide variety of desired activities may be added to a list, however, researching the availability of event times while coordinating with already planned activities may not be feasible. In particular, the total combination of possible schedules that may be generated from analyzing all the available activities and times may be of an order of magnitude beyond human capability for solving. Arranging tasks to achieve maximum completion under limited constraints may require time-consuming planning.

For highly active individuals, travel between multiple activities may add to the complexity by requiring additional time and cost considerations. In cases where task locations span a wide geographic region, determining an optimal route may require highly sophisticated analysis. While use of a global positioning system (GPS) device and mapping data may aid in calculating distances between a current position and desired targets, determining optimal travel paths between activities may require retrieving and examining a wide variety of other information. Rapidly changing conditions, such as traffic and weather, may impede calculation of the most efficient travel path. Further, spontaneously adding additional waypoints to a planned route may substantially increase the complexity in determining minimal travel time and cost. Task scheduling and management for activities dispersed across a geographic region presents many challenges for busy people. Conventional techniques may include additional drawbacks as well.

BRIEF SUMMARY

The present embodiments may relate to systems and methods for optimizing travel plans via adaptive waypoint and route scheduling. The system may include one or more servers, one or more user computing devices, one or more sensors, one or more insurance provider servers, third party computing systems, one or more client devices, and/or one or more databases.

In one aspect, an adaptive mapping computing device having at least one processor and/or associated transceiver in communication with at least one memory device may be provided. The at least one processor may be programmed to retrieve a plurality of tasks associated with a user and to retrieve geographic mapping data. The at least one processor may also be programmed to generate a route model based upon the retrieved plurality of tasks and the retrieved geographic mapping data. The at least one processor may be further programmed to execute the route model to determine an optimal route. The at least one processor and/or associated transceiver may also be programmed to transmit, to the user, an optimized travel plan based upon the optimal route. The computing device may include additional, less, or alternate functionality, including that discussed elsewhere herein.

In another aspect, a computer-implemented method for generating an optimal travel plan using an adaptive mapping computing device having at least one processor and/or associated transceiver in communication with at least one memory device may be provided. The computer-implemented method may include, via the at least one processor, retrieving a plurality of tasks associated with a user and retrieving geographic mapping data. The computer-implemented method may also include, via the at least one processor, generating a route model based upon the retrieved plurality of tasks and the retrieved geographic mapping data, and executing the route model to determine an optimal route. The computer-implemented method may also include, via the at least one processor and/or associated transceiver, transmitting, to the user, an optimized travel plan based upon the optimal route. The method may include additional, less, or alternate actions, including those discussed elsewhere herein.

In yet another aspect, a non-transitory computer-readable storage medium having computer-executable instructions embodied thereon may be provided. When executed by an adaptive mapping computing device having at least one processor and/or associated transceiver in communication with at least one memory device, the computer-executable instructions may cause the at least one processor to retrieve a plurality of tasks associated with a user and retrieve geographic mapping data. The computer-executable instructions may also cause the at least one processor to generate a route model based upon the retrieved plurality of tasks and the retrieved geographic mapping data. The computer-executable instructions may further cause the at least one processor to execute the route model to determine an optimal route. The computer-executable instructions may also cause the at least one processor and/or associated transceiver to transmit, to the user, an optimized travel plan based upon the optimal route. The instructions may direct additional, less, or alternate functionality, including that discussed elsewhere herein.

Advantages will become more apparent to those skilled in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements, which are presently discussed, it being understood, however, that the present embodiments are not limited to the precise arrangements and are instrumentalities shown, wherein.

Figure 1:
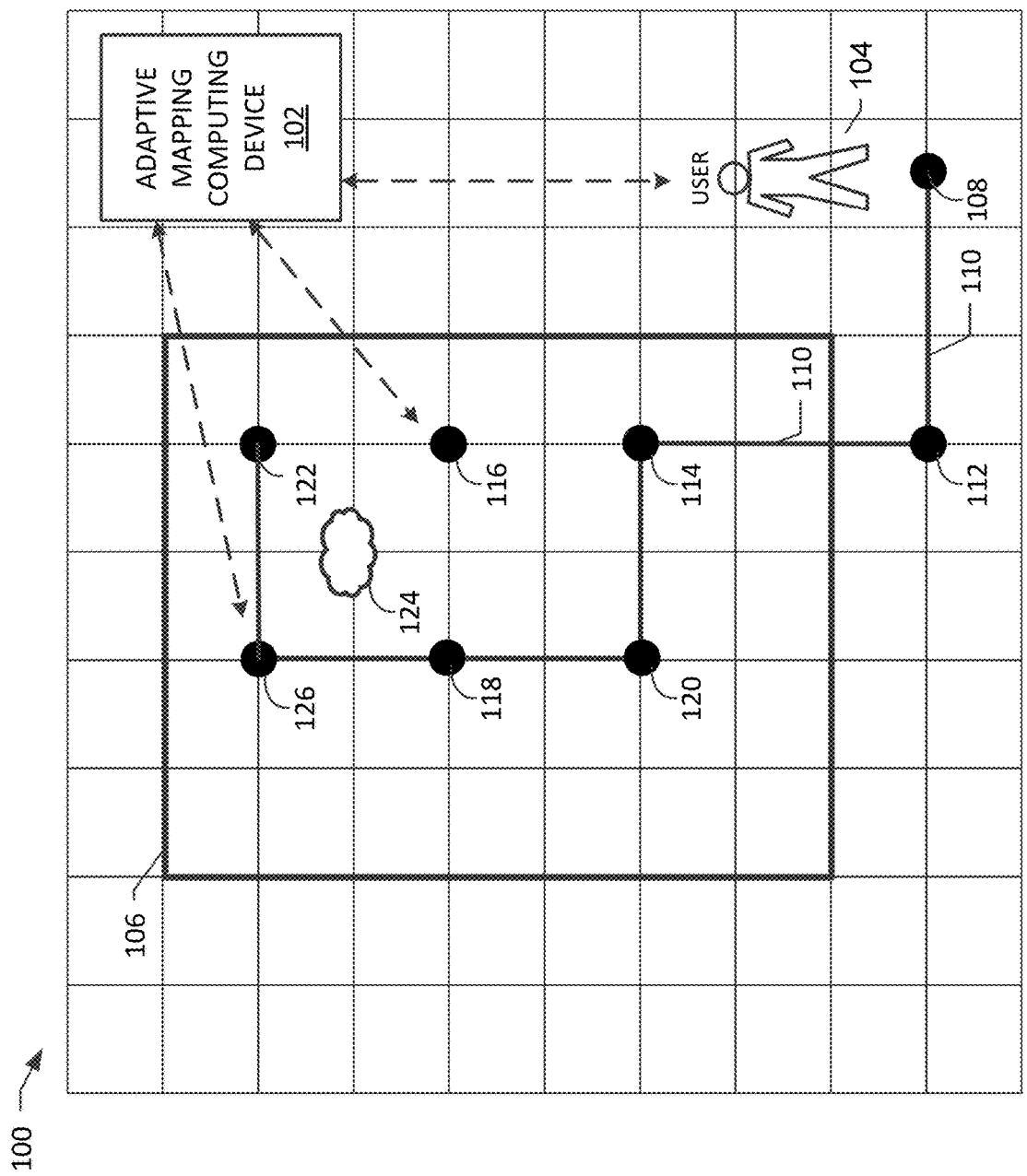
FIG. 1 illustrates a diagram of an exemplary adaptive mapping (AM) computing device configured to optimize a travel plan for a user.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for optimizing travel paths based upon learned task scheduling. In particular, artificial intelligence systems and methods may be used for predicting, planning for, and scheduling desired tasks. In addition, adaptive route optimization may be used for determining efficient routes for travel based upon the scheduled tasks and spontaneous, independent factors.

"Vehicle," as used herein, may refer generally to any vehicle owned, operated, and/or used by one or more vehicle users. A vehicle may include any kind of vehicle, such as, for example, cars, trucks, busses, all-terrain vehicles (ATVs), motorcycles, recreational vehicles (RVs), snowmobiles, boats, autonomous vehicles, semi-autonomous vehicles, user-driven or user-operated vehicles, industrial vehicles (e.g., construction vehicles), "riding" lawnmowers, farm equipment (e.g., tractors), planes, trains (e.g., cargo, maglev, trams, subways, monorails, etc.), helicopters, bicycles, scooters, mopeds, flying cars, spacecraft, robo-taxis, self-driving taxis, and/or any kind of land-, water-, air- or space-based vehicle. A vehicle may be motorized (e.g., using a combustion engine, steam engine, and/or electric motor).

"User," "vehicle user," and/or "driver," as used herein, may refer generally to a person who is responsible for the ownership and/or operation of a vehicle, and who has access to use of the vehicle. Vehicle users may include owners, lessors, and/or renters, or any combination thereof, for example, of a vehicle. Vehicle users may be personal vehicle users (e.g., may be responsible for and have access to one or more vehicles for personal use), corporate vehicle users (e.g., corporate managers who may be responsible for and have access to one or more vehicles associated with corporate use and/or with a corporate entity), and/or passenger-users (e.g., passengers of mass-transit systems and/or ride-share passengers).

"Autonomous vehicle," as used herein, may refer generally to any vehicle that has at least one automation system that is related to the piloting of the vehicle (e.g., warning systems assisting in a piloting task, intervention systems performing a piloting task, control systems performing a piloting task). The term "unautomated vehicle" refers to vehicles in which no automation systems are present (e.g., the vehicle is being piloted by the full-time performance of a human driver, and without enhancements from warning or intervention systems). The terms "semi-autonomous vehicle" and "autonomous vehicle" may be used interchangeably in some instances, and the term "autonomous vehicle" may be used to refer to both semi-autonomous vehicles and autonomous vehicles for purposes of convenience.

"App," as used herein, may refer generally to a software application installed and downloaded onto a user computing device and executed to provide an interactive graphical user interface at the user computing device. An app associated with the computer system, as described herein, may be understood to be maintained by the computer system and/or one or more components thereof. Accordingly, a "maintaining party" of the app may be understood to be responsible for any functionality of the app and may be considered to instruct other parties/components to perform such functions via the app.

"Telematics data," as used herein, may refer generally to data associated with monitoring a moving computing device. Telematics data may incorporate location, movement (e.g., speed, direction, acceleration, braking, cornering, etc.), and condition (e.g., "on", "off", in-motion, etc.) data based upon a plurality of sensors on-board the computing device and/or connected to the computing device. Accordingly, where the computing device is associated with a vehicle, the telematics data may be associated with monitoring the vehicle. Where the computing device is a personal mobile computing device, such as a smart phone, the telematics data may be associated with monitoring the personal mobile computing device. In at least some cases, the personal mobile computing device may be used to capture vehicle telematics data, where the personal mobile computing device is present in/on a vehicle during motion/use of the vehicle.

"Sensor data," as used herein, may refer generally to data captured by sensors that is not necessarily associated with the movement of a computing device. For example, sensor data for a vehicle may include data that captures movement of occupants of the vehicle, which may not affect the motion of the vehicle. In some cases, telematics data may include sensor data, where data is sent in packets that include data from all sensors associated with a computing device (e.g., both motion and non-motion sensor data).

"Contextual data," as used herein, may refer generally to includes data not specific to the user but descriptive of the environment around and/or associated with the user at the time the telematics data (and/or sensor data) was captured. Contextual data may include ambient data (e.g., weather data, traffic data, market data), data associated with other computing devices or vehicles, policy data (e.g., posted speed limits, road closures, detours, etc.), cost data (e.g., gas prices, insurance policy premiums, maintenance costs, etc.), and the like. In some cases, contextual data is accessed from one or more third-party sources. Additionally or alternatively, contextual data is collected from sensors on one or more computing devices within the computer system described herein (e.g., user computing devices).

"Personal mobility (PM) insurance" or "personal mobility policy (PMP)," as used herein, may refer generally to insurance policies based upon a user's usage of various forms of transportation. As increasingly more personal mobility options (e.g., modes of transportation) become available, users have more options to choose from when it comes to travel. Personal mobility insurance may provide coverage when a user is a pedestrian, a passenger of a ride-sharing service, and/or a driver of a rental vehicle, a semi-autonomous vehicle, and/or an autonomous vehicle. In other cases, personal mobility insurance may provide a user with coverage when the user rides a bike or an electric scooter.

Personal mobility insurance further provides coverage in cases where a user may not own a vehicle and/or not drive. For example, the user may travel from place to place by using various alternative forms of transportation, including walking, biking, using public transportation, and/or using ride-sharing services. In these cases, personal mobility insurance may offer coverage if the user is injured as (i) a ride-share service passenger due to the driver's negligence or fault, (ii) a pedestrian getting into or out of a ride-share vehicle, and/or (iii) a bike or electric scooter rider due to being injured by an uninsured motorist.

"On-demand insurance," as used herein, may refer generally to providing PMP (personal mobility policy) and/or micro-mobility UBI (usage-based insurance) quotes to a user in real time when coverage is requested by a user. On-demand insurance may provide coverage on a pay-as-you-go basis for each trip taken by the user (e.g., insurance provided on a trip-by-trip basis), as opposed to paying for coverage for a standard period of time (e.g., six months). For example, coverage may be requested or purchased for certain trips a user plans to take. PMP and/or micro-mobility insurance may be offered in various units, such as miles, time units, or rides. Micro-mobility insurance may cover short trips, such as the first mile and/or the last mile to a destination. For instance, the first mile and/or last mile to a destination may include users traveling by alternate forms of transportation, such as public transportation, ride shares, bicycles, or e-scooters.

"Optimal travel plan," as used herein, may refer generally to an arranged listing and/or schedule by which a user that is associated with the travel plan may achieve a specified combination of transportation to geographic locations that is determined to achieve increased or reduced parameter values dependent on the respect factors by which the travel plan is optimized. An optimal travel plan may be based upon a comparative analysis of routes, each route having paths between waypoints, each waypoint associated with at least one activity (e.g., task). Tasks may have starting times, durations, completion times, and other preferential factors. Relationships between tasks and/or the preferential factors may be created for the purposes of performing the methods and systems as described herein.

In one exemplary embodiment, an adaptive mapping (AM) computing device may be configured to determine an optimal travel plan. In particular, the AM computing device may be configured to receive task information, retrieve historical data for predictive modeling and analysis, generate task predictions based upon user preferences and historical user activity data, retrieve geographic mapping information including, for example, merchant location information, retrieve event data, identify and calculate efficient routes, and present a determined optimal travel plan with waypoints overlaid onto mapping data.

For example, a user currently located in an office building, may be interested in eating lunch at a particular restaurant located three blocks east of the office building between the hours of 1:00 pm and 2:00 pm. The user may also have unknowingly run out of eggs. A grocery store is one mile away west of the user's office building. The user may also be planning to attend a potluck dinner at a friend's home located two miles north of the office building. To prepare for the potluck dinner, the user will need to stop by home to bake a cake. The user's home is 1 mile south. Conventionally known as the travelling salesman problem or vehicle routing problem, determining an efficient route to incorporate all the locations is classified as an NP-hard problem, in other words, not verifiable in polynomial-time.

Manually solving the problem may therefore be difficult. While use of commercial solvers applying greedy algorithms such as the savings algorithm is helpful, practical, everyday travel planning is further complicated by time requirements, forgotten tasks, modes of travel, and/or other real-time factors such as weather and traffic congestion. In the exemplary embodiment, the AM computing device may identify relevant tasks, identify waypoints to accomplish the tasks, and determine an optimal travel plan prior to the user embarking on their journey.

In the exemplary embodiment, the AM computing device may generate and execute a task model to determine potential tasks to accomplish. The task model may be based upon at least user history, user preferences, and user-identified tasks. In some embodiments, a user profile may be generated based upon the user preferences and history of activities performed. For example, the user may input a task to accomplish, indicate that the task is a regular task that is repeated at regular intervals, indicate a time period to accomplish the task, and identify a geographic location where the task is to be accomplished. In some embodiments, the user may further select a mode of transportation. Additionally or alternatively, the user may identify a ranking and/or rating for accomplishing the task. For example, traveling to work may be designated a highly required task while visiting a mother-in-law may be regarded as a low priority task.

Determining what tasks to accomplish may include retrieving data from a number of sources. In the exemplary embodiment, the AM computing device stores, in a memory device, user preferences (e.g., ratings of tasks), historical data related to user activities (e.g., past tasks identified), merchant data (e.g., geographic locations, hours of operation and/or availability, and services offered, etc.), and community event information (e.g., concerts, performances, sporting events, community meetings, etc.).

Historical data related to user activities may be received manually from user input and/or previously scheduled tasks stored in memory. For example, frequent travel to the same merchant (e.g., grocery store, coffee shop, etc.) at similar times using the same mode of transportation along similar routes may be recorded to the user's historical data in, for example, a user profile. In the exemplary embodiment, user input tasks may be used to generate the user profile. In some embodiments, the AM computing device may receive and store telematics data received from vehicles (e.g., sensors, etc.) and/or mobile devices (via GPS for example) used by the user during travel and participation in activities. The AM computing device may use the telematics data to generate optimized travel plans as described in detail below.

In the exemplary embodiment, historical data may include frequent travel to a particular merchant at a particular day and time. The AM computing device may analyze the historical data to determine one or more tasks to include in the travel plan. In the above example, the model may identify regular trips to the same grocery store. If the user has not made such a trip recently, the model may increase a parameter (e.g., a task score) causing the travel plan to include a trip to the grocery store. In another example, the model may decrease a parameter if travel to a particular destination has not occurred after a period of time. For example, if a user has not travelled to a hobby store for a period of time, the likelihood that the user desires travel to the hobby store may be reduced and the task may receive a low weight or task score and/or may not be offered. As such, a weighting and/or task scoring system may be used as part of the task model.

In the exemplary embodiment, the AM computing device may generate an optimal travel plan based upon determined waypoints and/or routes. Waypoints and routes may be determined by a number of different methods. In the exemplary embodiment, a routing model may be generated and executed to determine the optimal waypoints and routes for the travel plan. Waypoints may be determined based upon the determined tasks. Route information between the waypoints may be determined based upon geographic data such as mapping and GPS (global positioning system) data. Potential paths may be analyzed to determine an optimal route. Routes may include one or more path. Each path may be associated with one or more modes of transportation. For example, the AM computing device may determine a route to include a combination of mass transportation and walking. In some embodiments, the AM computing device may analyze modes of transportation and alter the waypoints based upon the modes of transportation and may optimize the travel plan using a process of optimization based upon both factors. In some embodiments, the AM computing device may use recursive algorithms and/or neutral network processing to identify an optimal travel plan.

Determining waypoints and/or routes may include retrieving data from external third-parties. For example, for a particular identified task, similar merchants may be evaluated to determine optimal efficiency. If a first task includes traveling to a first merchant at a particular geographic destination, or along a particular route, and a second task includes travel to a second merchant at a very distant geographic destination from the first merchant, a third merchant similar to the second merchant, but closer to the first merchant, may be identified. The third merchant may replace the second merchant to increase travel planning efficiency and/or be offered to the user for approval as an alternative.

In some embodiments, the waypoint determination may include incorporating schedules and preference of associated parties including, for example, spouses, significant others, family members, friends, colleagues, classmates, co-workers, and/or clients. In the example above, a spouse may prefer a second restaurant located one mile north of the office building, but may not be available until 1:30 pm. The AM computing device may include and/or update the travel plan accordingly to include the second restaurant and/or increase the weighting and/or score for the second restaurant when optimizing the travel plans.

In some embodiments, the AM computing device may suggest third-party services such as delivery to accomplish tasks. For example, if delivery of grocery items may expedite and/or more efficiently accommodate the user's schedule, a grocery deliver service may be offered as an alternative to traveling to the grocery store. In some embodiments, the AM computing device may automatically request the service and cancel the task from the user's schedule.

Route optimization may be based upon multiple different factors. For example, the AM computing device may optimize the travel plan based upon maximum task accomplishment, minimizing expense (e.g., fuel, vehicle depreciation, tolls, PMP or UBI insurance costs, etc.), minimizing time, maximum social benefit, minimum environmental impact, risk avoidance (insurance), geographic avoidance (e.g., congested shopping malls). In some embodiments, the user may select and/or rank factors for optimization. For example, the user may assign weights to one or more optimization factor. For example, the user may prefer mass transit, over traveling with transportation network company (TNC) (e.g., ride-sharing services), but for certain distances may prefer to walk or drive a scooter if the scooter is electric and if those travel options, although increasing the travel time required, minimizes the user's environmental impact.

In some embodiments, the AM computing device may include the user assigned weights with weights assigned by the AM computing device into the optimization. Additionally or alternatively, the AM computing device may include a default selection or ranking of factors to determine an optimal route. The AM computing device may also receive additional contextual and/or real-time data for processing to perform continuous, adaptive pathing based upon fluctuating conditions (e.g., weather, traffic, events, etc.). For example, if the AM computing device receives weather data for an impending weather event, tasks may be canceled, routes may be rerouted, and/or modes of transportation may be changed. Route optimization may be based upon the associated risks of each mode of transportation and/or route. In the exemplary embodiment, the AM computing device analyzes various risk factors such as probability of accidents along a path, crime, and/or potential congestion causing delay. Use and generation of contextual data is described in more detail below.

The AM computing device may offer the generated travel plan to the user or may simply provide instructions to the user based upon the travel plan. For example, the AM computing device may cause a user computing device to dictate audio instructions and/or other forms of notification to the user. In some embodiments, the AM computing device may propose alternatives to accomplish a task. User input may be received to select an alternate waypoint or an alternate method for accomplishing the task. The AM computing device will update the travel plan according to the user input. In some embodiments, the AM computing device may generate alternatives to the user selected options and display the alternatives for selection.

In the exemplary embodiment, the AM computing device may generate a user interface to present to the user. The user interface includes a visualization of a geographic map having an overlaid optimized route with way points. In some embodiments, a setup screen and/or registration screen may present multiple optimization criteria for selection and/or configuration. The user interface may also include a listing of tasks adjacent, in proximity with, and/or overlaid on the displayed map. The user interface may enable the user to cancel, delete, and/or suspend tasks. The user interface may also enable a user to manually enter new tasks, or request and/or view listings of potential other tasks generated and offered by the AM computing device. In other embodiments, alternate travel routes and/or methods may be presented to the user on the display map and/or by otherwise indicating to the user that an alternate travel route is available.

In some embodiments, the AM computing device may generate user incentives for the user that may influence the user's travel behavior based upon the user's profile and/or contextualized profile. In one particular embodiment, the user analytics computing device may generate a user offering including a notification of the costs and/or environmental impact associated with the user's travel behavior and a recommendation for reducing those costs based upon a proposed change to the user's travel plans. In some embodiments, the AM computing device may access contextual data including cost data and generate contextualized profiles based upon the user's profile and upon received data as described below.

In some embodiments, the user may be offered various incentives to travel according to a recommended travel plan. For example, the AM computing device may offer an incentive if the user travels using mass transit. In some embodiments, the user may "earn" rewards and/or points for different types of incentivized travel. Incentives may be offered in a game, game-like, or gamification manner to further encourage use of incentivized travel. For example, a user may be encouraged to travel along a longer route that includes a more resilient, low-maintenance road and/or using an environmentally friendly, but slower, mode of travel such as a bicycle. Use of the promoted options may earn the user points that may be used for future travel such as discounted or free entry to mass transit systems. In another example, a longer but lower-risk route may include a rebate, refund, and/or discounted insurance price.

In the exemplary embodiment, the AM computing device is configured to leverage telematics data to generate improved travel planning, based upon a user's behavior as indicated in the telematics data. The telematics data may be received from a plurality of sources, including a user's mobile device and/or one or more connected vehicles. Additionally or alternatively, the AM computing may receive and analyze additional data, such as sensor data and/or contextual data. In the exemplary embodiment, the AM computing system may capture and synthesize this data, leveraging machine learning and/or artificial intelligence, to generate adaptive mapping and travel planning that may save the user money, save time, reduce a user's risks, provide incentives and rewards, and the like.

The AM computing device may be in communication with one or more computing devices associated with a user to interact with the user (e.g., display the above described user interface). These computing devices may include a personal mobile computing device, such as a smart phone, tablet, and the like. These computing devices may additionally or alternatively include a vehicle computing device associated with a personal vehicle of the user (e.g., a vehicle that the user drives or operates, which may be a non-autonomous, semi-autonomous, and/or autonomous vehicle). A vehicle computing device may include a computing device integral to the vehicle and/or a personal mobile computing device that is in, on, or otherwise associated with the vehicle while the vehicle is operating. The AM computing device may be configured to aggregate, combine, synthesize, parse, compare, and/or otherwise process this data in order to (i) build profiles reflective of user behavior, such as interests, travel preferences, and the like, and/or (ii) generate user tasks based upon this profile.

The AM computing device may store any received, retrieved, and/or accessed data in one or more databases, and may store any profiles, user activities, and/or other generated data in the one or more databases. A database may be any suitable storage location, and may in some embodiments include a cloud storage device such that the database may be accessed by a plurality of computing devices (e.g., a plurality of user computing devices, insurance computing devices, third-party computing devices, etc.). The database may be integral to the AM computing device or may be remotely located with respect thereto.

As described above, the AM computing device may include use of contextual data. The contextual data may include information associated with a common or frequently travelled route. As used herein, a "common" route may include a route the user travels more than a threshold number of times within a certain duration (e.g., within a week, month, or year) and/or a route the user travels with a defined periodicity (e.g., every weekday morning, every Tuesday evening, etc.). The AM computing device may identify common routes using telematics data from the user's mobile device and/or connected vehicle. In some instances, the contextual data associated with a common route may include, for example, traffic data, traffic light timing data, weather data, and the like. Traffic data may be provided by a third party (e.g., WAZE or GOOGLE) and/or may be determined based upon sensor and/or telematics data from a plurality of connected vehicles. Traffic light timing data may be provided by a third party (e.g., by a representative of a city or metro area) and/or may be determined based upon sensor and/or telematics data from one or more connected vehicle (e.g., using image/video data captured by on-board cameras while the vehicle(s) travel along the common route).

The AM computing device may synthesize this contextual data with the travel profile (e.g., the user's common routes, the time(s) the common routes are travelled, the user's speed along the common route, mode of travel, etc.) to generate a contextualized travel profile that includes a model of the user's travel along the common route. In particular, the AM computing device may train a machine learning model using the user's travel behavior over a period of time (e.g., one week, two weeks, one month, etc.) such that the model learns the user's common routes and activities, when the user travels along the common routes, preferred modes of travel, how the user travels along the common route (e.g., average speed overall, average speed along certain portions of the route, number of stops, etc.) and how the contextual data (e.g., traffic, traffic lights, weather) affects the user's travel behaviors.

Health considerations may also be included. For example, if a correlation between travel along polluted routes is associated with a decline in the user's health, the data may be additionally processed by the AM computing device.

The task model may be trained according to the contextual profile. The AM computing device may use the output from the trained model to identify an efficient route. The most efficient route may include the route in which the user encounters the fewer number of red lights, the route in which the user is stopped or slowed by traffic the least, and/or the fastest route. The trained model may generate routes, including the most efficient routes, based at least in part upon the user's typical speed along the common route and/or the posted speed limit along the common route. In some instances, the most efficient route includes travel at the posted speed limit.

Cost data may also be a factor for optimizing a route. Costs associated with a particular vehicle, such as the driver's vehicle may be used. For example, the cost data may be associated with gas mileage data for the make, model, and/or year of the driver's vehicle. The cost data may also include geography-dependent costs, such as the cost of gas, vehicle maintenance, and/or vehicle repair in the user's geographic area. The cost data may also include costs specific to the user, such as an insurance premium for an insurance policy associated with the user's vehicle.

In some cases, the contextual data may include additional geography-dependent data, such as available public transportation (e.g., buses, trains, streetcars, etc.) and/or other alternative forms of transportation (e.g., taxis, ride-sharing, bike rentals or bike-sharing, scooters, etc.). Additionally or alternatively, PMP and/or UBI-based insurance costs may be associated with the alternative forms of transportation and may be additionally processed by the AM computing device.

The AM computing device may be further configured to synthesize contextual data with the user's driving profile and/or existing contextualized driving profile to calculate costs associated with the user's driving behavior. For instance, the AM computing device may calculate the gas costs associated with the user's average driving behavior, which is 3-5 MPH over a posted speed limit. The AM computing device may additionally or alternatively calculate estimated maintenance costs associated with this driving behavior. The AM computing device may therefore generate incentives including a recommendation that the user decrease their average speed by 3-5 MPH and a notification that such a behavior change could result in a savings of the above-described costs.

In some embodiments, the AM computing device may be configured to parse telematics data associated with each different travel mode based upon received telematics data from a user computing device. In some embodiments, the AM computing device may leverage artificial intelligence and/or machine learning capabilities to determine which travel mode a user was using at any time. For example, certain models may be trained to recognize different travel modes based upon a speed or pace of the user, a location of the user during travel (e.g., within a park that does not allow vehicles), a distance travelled by the user, and/or a time of travel.

Additionally or alternatively, the AM computing device may receive, retrieve, request, and/or access other data to determine and/or confirm a particular mode of travel. For example, the AM computing device may be configured to leverage data from rental applications executed on a user computing device (e.g., bike rentals, scooter rentals, etc.) to determine and/or confirm a user's travel mode.

In the exemplary embodiment, the AM computing device may be in a remote server configuration and in communication with a user computing device over a network such as the Internet. A user (e.g., driver, pedestrian, mass transportation rider, etc.) may use the user computing device (e.g., mobile phone, tablet, on-board vehicle computing system, etc.) to communicate with the AM computing device. The AM computing device may periodically and/or continuously transmit, to the user computing device, updated travel planning information to the user computing device to update the user about relevant real-time information (e.g., weather, traffic congestion, merchant information, etc.).

In the exemplary embodiment, the user computing device may include an app configured to communicate with the AM computing device. In some embodiments, the AM computing device may be the user computing device. In some embodiments, the AM computing device may host a website having web pages programmed to display the user interface on a user computing device as described herein.

Exemplary technical effects of the systems and methods described herein may include, for example: i) generating task models based upon tasks input by a user and predicted tasks determined from a history of activities previously planned for the user using, for example, machine learning methods; ii) generating route models based upon tasks, retrieved geographic mapping data, merchant data, relationship data, and third party data (e.g., insurer networks configured to provide risk data and/or insurance costs associated with the user and/or the route); iii) executing route models to determine optimal routes based upon optimization factors (e.g., cost, risk, speed, distance, contextual data, etc.); and iv) dynamically updating optimized travel plans based upon real-time information (e.g., weather, event, traffic data, etc.).

Exemplary System for Generating Optimal Travel Plans

FIG. 1 illustrates a diagram 100 of an exemplary adaptive mapping (AM) computing device 102 configured to optimize a travel plan for a user 104. AM computing device 102 may be in communication with user 104 through, for example, a wireless connection between AM computing device 102 and a user computing device (not shown).

In the exemplary embodiment, user 104 may have one or more tasks to accomplish. The tasks may require travel to different geographic locations. In the exemplary embodiment, AM computing device 102 automatically determines an optimal travel plan 106 for user 104. Optimal travel plan 106 may include a number of waypoints, each waypoint associated with at least one task. User 104 may be located at an initial starting waypoint 108 and may travel along various paths 110 between waypoints 108, 112, 114, 116, 118, 120, 122, and 126. Each path 110 may have an associated mode of travel (e.g., ride-share, mass transit, bicycle, walking, etc.). Waypoints 108, 112, 114, 116, 118, 120, 122, and 126 may be merchant locations, work-related locations, community event locations, family and/or friend related locations, sporting event locations, concerts, performances and the like.

In the exemplary embodiment, AM computing device 102 retrieves and analyzes tasks and associated waypoints for tasks and determines an optimal route for user 104. In the exemplary embodiment, user 104 may register for adaptive mapping and travel planning services with AM computing device 102. Registration with AM computing device may include submitting preferences such as preferred modes of travel, optimization factors (as described elsewhere herein), preferred activities, and preferred destinations (e.g., merchants, etc.). In the exemplary embodiment, user 104 identifies at least one task to perform and one associated geographic location to perform the task.

As shown in optimal travel plan 106, user 104 identifies three tasks to perform at associated waypoints 114, 116, and 122. For example, user 104 desires to travel to work at waypoint 114, then afterwards, travel to a grocery store to pick up a cake, and then travel to waypoint 122 to attend a pot luck dinner. In the exemplary embodiment, AM computing device 102 may identify tasks in addition to tasks identified by the user. AM computing device 102 may use any number of methods as described herein to automatically determine tasks for user 104 including artificial intelligence and machine learning methods applied to historical data for user 104 and contextual data as described elsewhere herein.

As shown in optimal travel plan 106, AM computing device 102 identifies a task to be completed at waypoint 120 and accordingly includes waypoint 120 in the user's travel plans. For example, AM computing device 102 determines that user 104 should stop by a post office located at waypoint 120 to deliver a letter. The location of the post office is accordingly included in optimal travel plan 106.

In the exemplary embodiment, AM computing device 102 may be configured to dynamically adapt the determined optimized travel plan to accommodate changing conditions. For example, user 104 may independently arrange travel to waypoints 108 and 112. AM computing device 102 may automatically re-calculate and/or re-route user 104 based upon the altered starting location and instruct user 104 to proceed with optimal travel plan 106 starting from waypoint 112. In the exemplary embodiment, AM computing device 102 receives user input indicating a change to the travel plan. In some embodiments, AM computing device 102 detects deviation from a prescribed route and automatically updates optimal travel plan 106 accordingly. Detection of deviation from a prescribed route may be accomplished via use of sensors, telematics data, vehicle data, and the like.

In the exemplary embodiment, AM computing device 102 may determine a more efficient route includes travel from waypoint 120 to waypoint 118 as opposed to travel from waypoint 120 to waypoint 116. For example, AM computing device 102 may determine that a merchant (e.g., grocery store) located at waypoint 118 may offer similar services (e.g., cakes) needed to accomplish the task identified by user 104 at waypoint 116. More specifically, AM computing device 102 may retrieve merchant information from memory and compare the merchant information to the task information input by user 104. In some embodiments, merchant information may be retrieved directly from the merchant. In some embodiments, AM computing device 102 is in communication with the merchant located at waypoint 116.

AM computing device 102 may request information related to the task. Continuing the above example, AM computing device 102 may request information related to available products (e.g., cakes). In the exemplary embodiment, AM computing device 102 identifies alternatives to optimal travel plan 106 and re-routes user 104 accordingly. In some embodiments, AM computing device 102 offers and/or otherwise proposes alternatives to user 104 for approval prior to re-calculating and/or re-routing.

In the exemplary embodiment, optimal travel plan 106 may be updated based upon real-time information. For example, AM computing device 102 may detect a weather event 124 and estimate that travel from waypoint 118 to waypoint 122 may be less efficient and/or be associated with increased risks. In some embodiments, weather, traffic, and other event data may be received from third-party services such as the National Weather Service. AM computing device 102 may re-calculate and generate a new optimal travel plan based upon and analysis of the received data.

In some embodiments, AM computing device 102 may communicate with merchants and/or other entities located at waypoint 126 to determine whether safe and efficient travel may be available at and/or near waypoint 126. As shown in diagram 100, AM computing device 102 determines travel from waypoint 118 to waypoint 126 and to waypoint 122 is optimal and presents routes accordingly.

Computing device 102 may include additional, less, or alternate functionality, including that discussed elsewhere herein.

Exemplary User Interface

Figure 2:
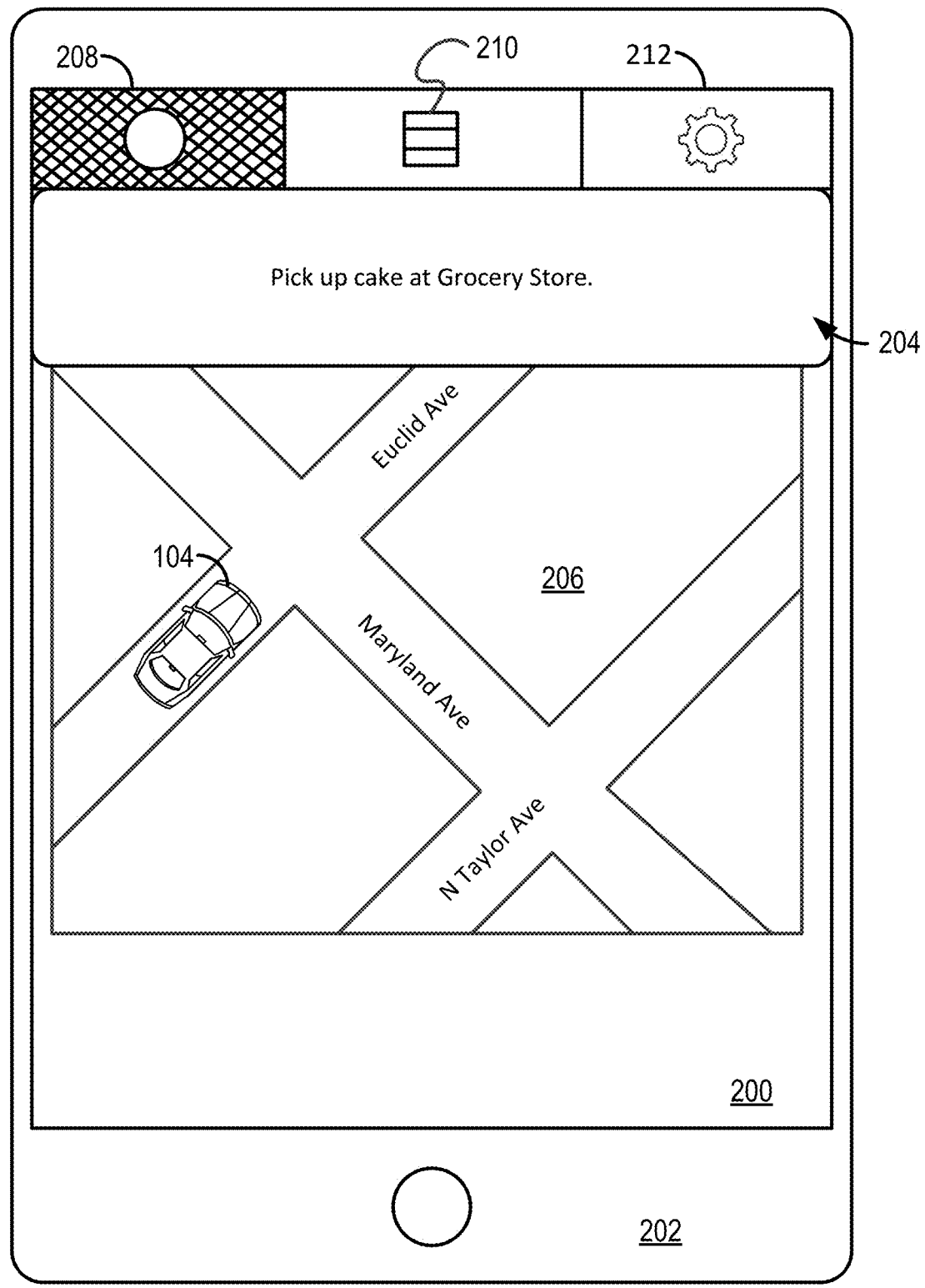
FIG. 2 illustrates an exemplary user interface for displaying optimized travel plans generated by the computing device shown in FIG. 1.

FIG. 2 illustrates an exemplary user interface 200 for displaying optimized travel plans generated by AM computing device 102 shown in FIG. 1. In the exemplary embodiment, AM computing device 102 generates and renders and/or causes a user computing device 202 to render user interface 200. In the exemplary embodiment, user interface 200 displays, presents, or otherwise conveys to user 104 (shown in FIG. 1) optimal travel plan 106 (also shown in FIG. 1). In the exemplary embodiment, at least a geographic map is displayed enabling user 104 to visually identify at least one route of optimal travel plan 106.

AM computing device 102 is configured to update in real-time user interface 200 based upon at least data received from user 104 such as GPS data. User interface 200 may include a visual representation of user 104 overlaid on the geographic map. User interface 200 may further include street names and identifying landmarks 206 indicating a way point and/or destination required to accomplish a task. In the exemplary embodiment, user interface 200 includes a message notification 204 to notify user 104 of the task to accomplish. Additionally or alternatively, user interface 200 may use audible notifications and/or tactile notifications.

In the exemplary embodiment, user interface 200 includes interactive controls to interact with user interface 200. Interactive control 208 actives a view of optimal travel plan 106. Interactive control 208 may also be used to modify the route, waypoints, and/or other aspects of optimal travel plan 106. In some embodiments, interactive control 208 may be used to change users. User profiles may be used to enable user computing device 202 to generate one or more optimal travel routes for different users.

Interactive control 210 may be used to activate views of incentive programs as described elsewhere herein. Interactive control 212 may be used to input, modify, update, and/or otherwise indicate user preferences related to user interface 200 and/or use profiles, accounts, registration, and/or any other information associated with user 104. For example, user 104 may use interactive control 212 to alter display settings (e.g., resolution, waypoint information, route information, etc.) of user interface 200. As another example, user 104 may use interactive control 212 to define travel optimization factors such as indicating a higher preference for reduce energy consumption modes of travel, reduced pollution routes, travel routes with scenic views, etc. User interface 200 may include additional, less, or alternate functionality, including that discussed elsewhere herein.

Figure 3:
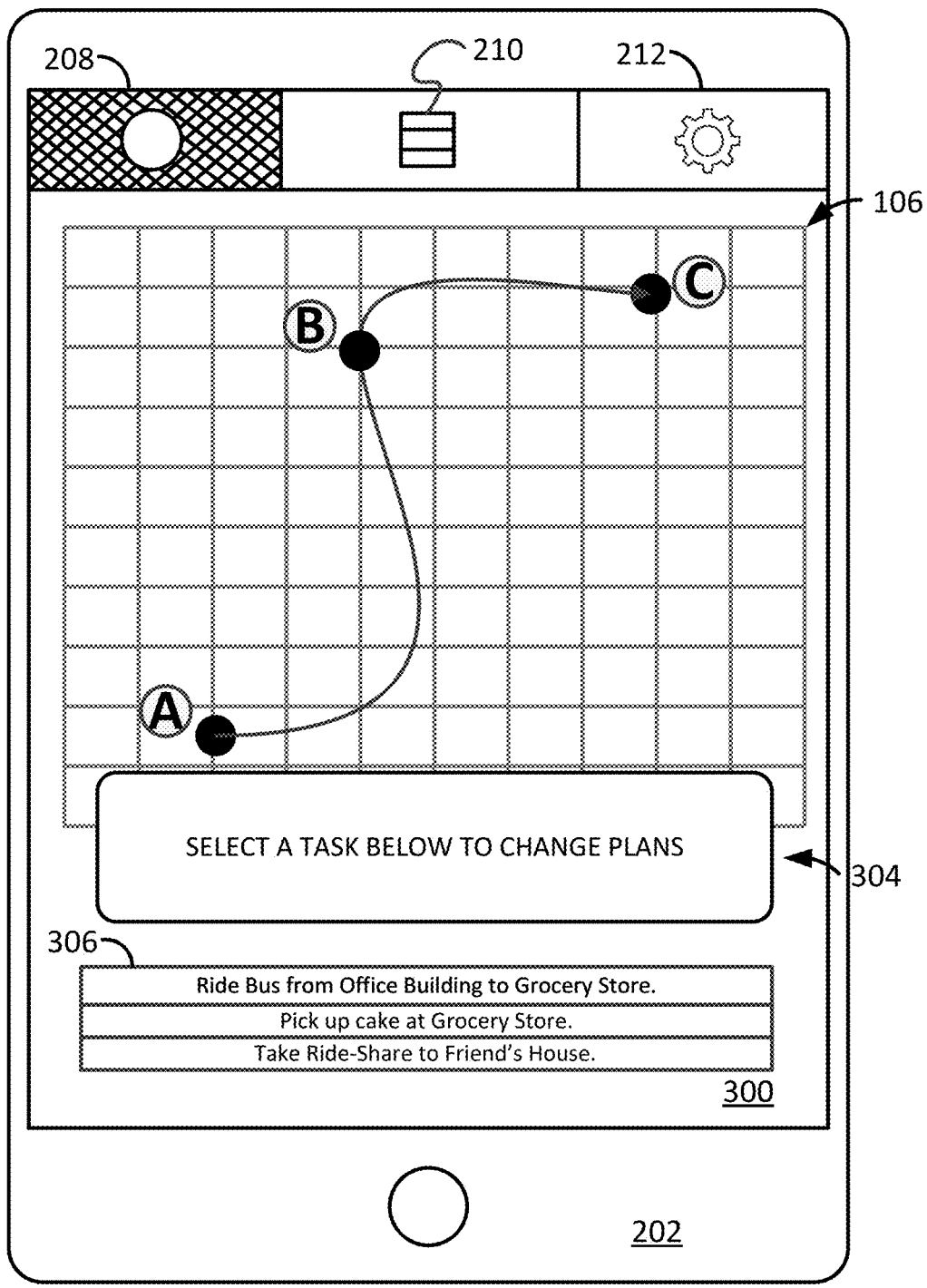
FIG. 3 illustrates an exemplary user interface for displaying travel plan options generated by the computing device shown in FIG. 1.

FIG. 3 illustrates an exemplary user interface 300 for displaying travel plan options generated by AM computing device 102 shown in FIG. 1. User interface 300 may display an alternative view of optimal travel route 106. User interface 300 may include a message and/or notification element 304 to display information, prompt user 104 to take action, indicate to user 104 potential options (e.g., alternate routes, alternate destinations to accomplish tasks, etc.), and/or display developing information such as emergencies and/or traffic congestion. User interface 300 may include a task list 306 including, for example, instructions, directions, route information, task information, and/or timing. In the exemplary embodiment, task list 306 may be further activate to present the additional information such as in a pop-up window, dialogue box, and/or overlaid on existing elements such as optimal travel path 106. User interface 300 may include additional, less, or alternate functionality, including that discussed elsewhere herein.

Figure 4:
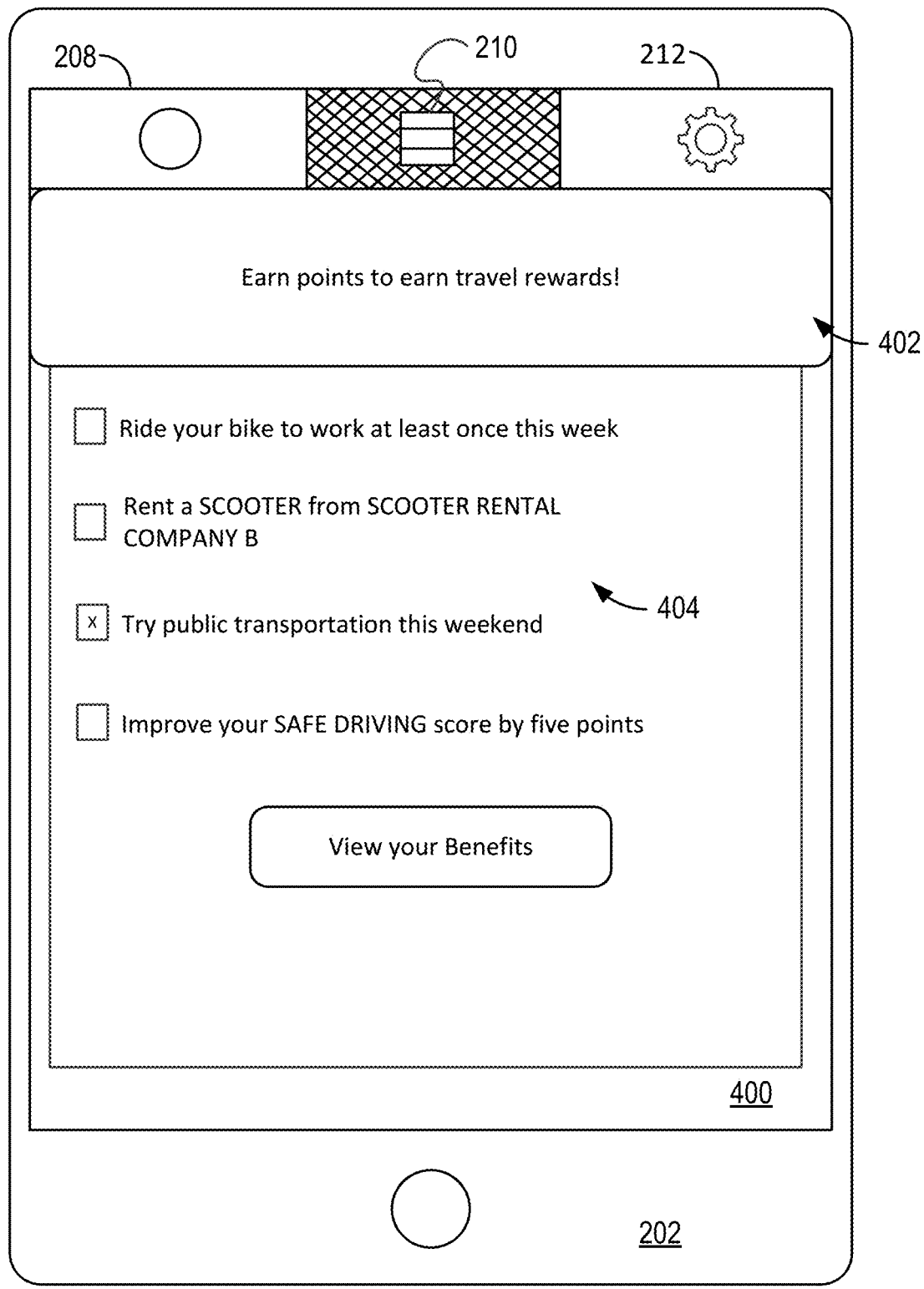
FIG. 4 depicts an exemplary user interface for displaying travel incentives generated by the computing device shown in FIG. 1.

FIG. 4 depicts an exemplary user interface 400 for displaying travel plan options generated by AM computing device 102 shown in FIG. 1. User interface 400 may include a message notification window 402 to display rewards information and/or advertisements. User interface 400 may include a listing of potential offers to encourage alternative modes of transportation 404, alternative routes, and/or activities sponsored and/or offered by merchants. User interface 400 may include additional, less, or alternate functionality, including that discussed elsewhere herein.

The aforementioned user interfaces 200, 300, and 400 may be combined into a single user interface and/or presented independently in separate user interfaces. User interfaces 200, 300, and/or 400 may be presented as web pages, on a website, and/or on a kiosk or public access terminal.

Exemplary Model Generation

Figure 5:
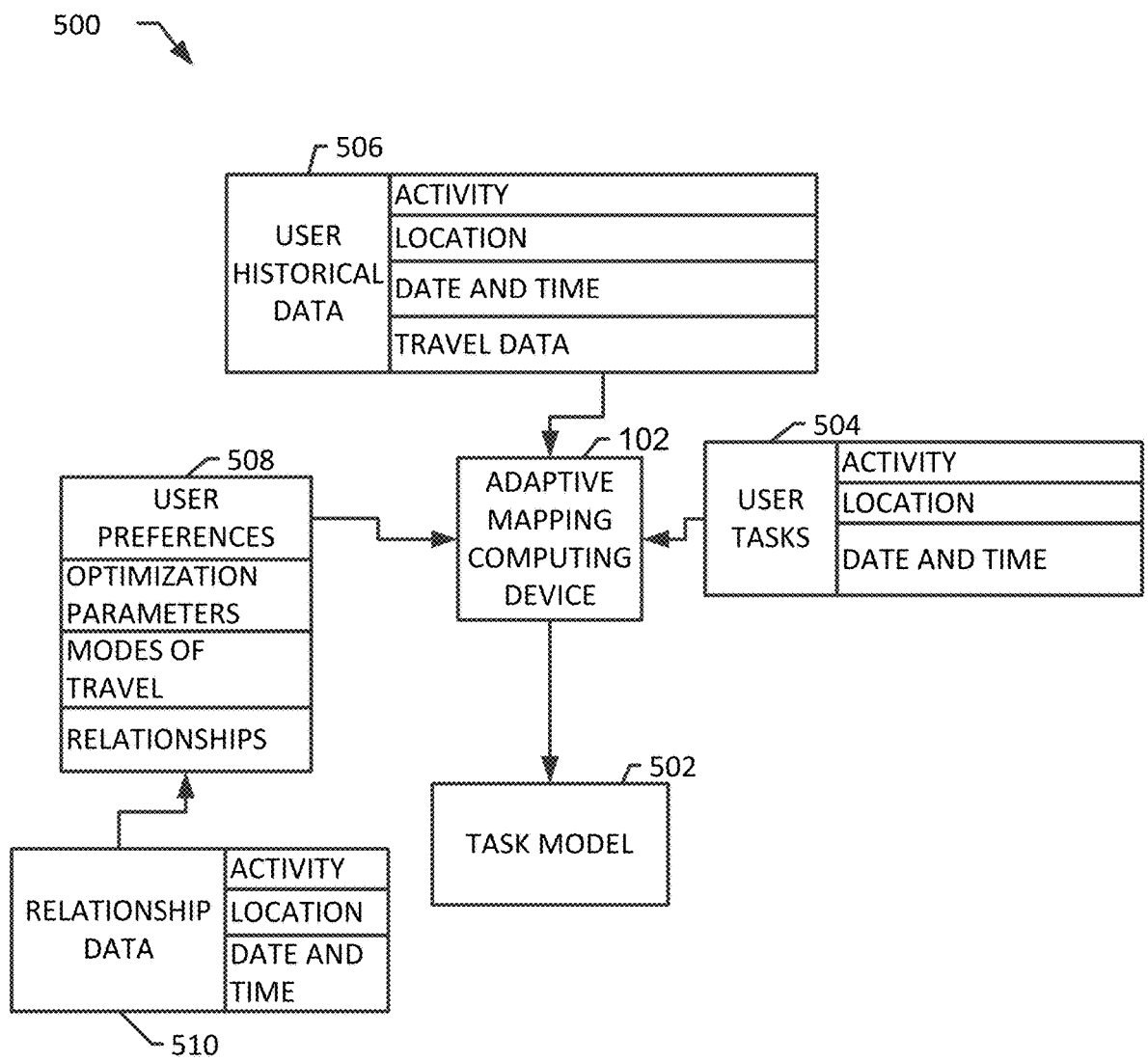
FIG. 5 depicts a simplified block diagram of an exemplary data structure for generating a task model used by the computing device shown in FIG. 1.

FIG. 5 depicts a simplified block diagram 500 of an exemplary data structure for generating a task model 502 used by AM computing device 102 shown in FIG. 1. AM computing device 102 may retrieve data from memory and/or remote sources to generate task model 502. AM computing device 102 may execute task model 502 to determine tasks for user 104 (shown in FIG. 1).

In the exemplary embodiment, AM computing device 102 may retrieve user tasks 504, user historical data 506, and user preferences 508 for analysis and generation of task model 502. User tasks 504 may include one or more tasks, each task indicating an activity, a location, a date, and a time. User historical data 506 may include a history of user data include past activities, past locations traveled to, dates and times for each respective activity, and/or travel data indicating routes and modes of transportation. User preferences 508 may include information input by user 104 such as optimization parameters, preferred modes of travel, and/or relationships.

In the exemplary embodiment, relationships may include, for example, spouses, children, family members (e.g., parents, siblings, cousins, grandparents, etc.), friends, co-workers, clients, business partners, service providers, etc. The relationships may be defined in relationship data 510 and may include activities with each individual, location of the individual and/or location of activities with the individual, and dates and times for activities with the individual. Conflicting schedules identified in relationship data 510 may alter location and/or date and time of tasks for user 104. In the exemplary embodiment, relationship data 510 may be included in user preferences 508.

AM computing device may analyze the above described data to generate and execute task model 502 to identify tasks for user 104. Task model 502 may include additional, less, or alternate functionality, including that discussed elsewhere herein.

Figure 6:
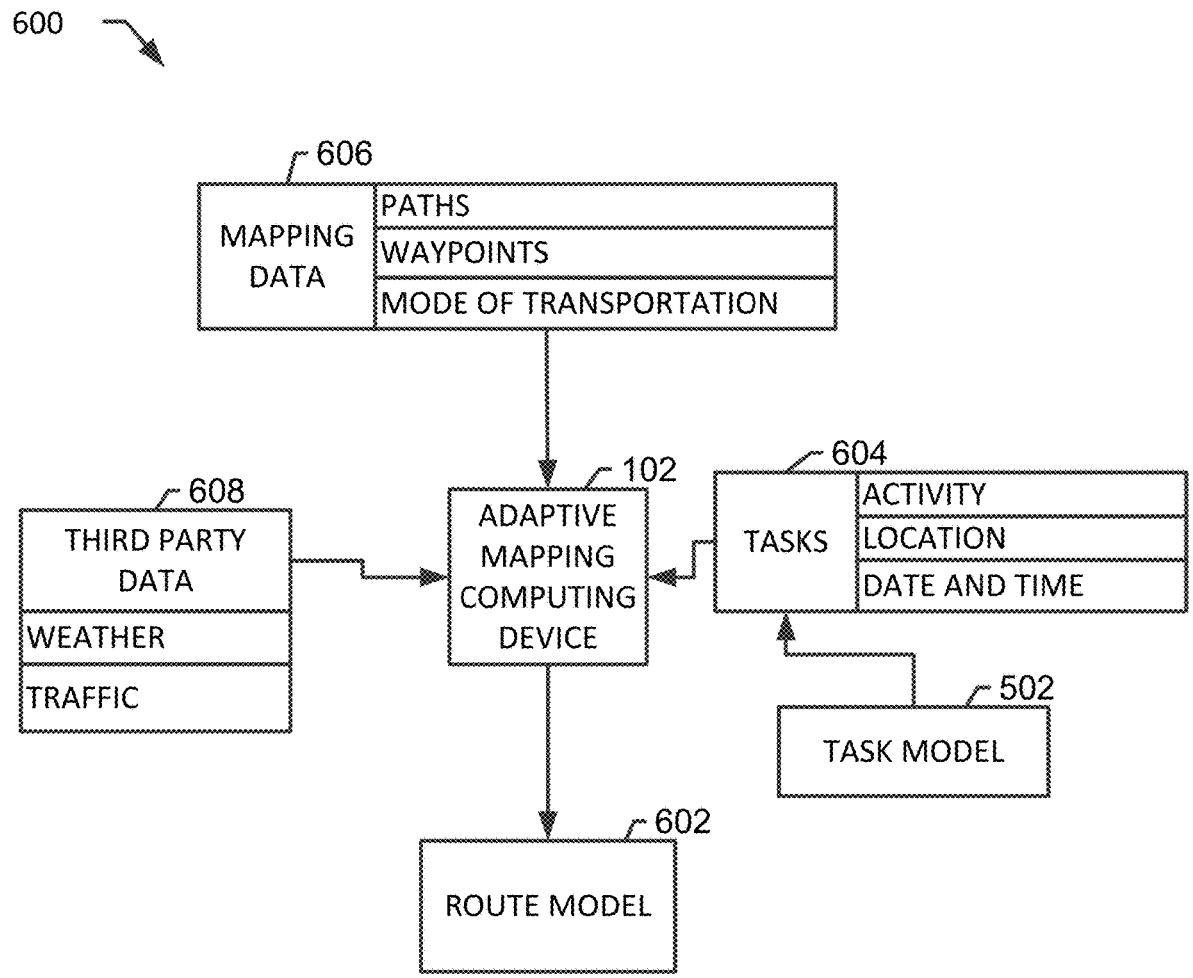
FIG. 6 depicts a simplified block diagram of an exemplary data structure for generating a route model used by the computing device shown in FIG. 1.

FIG. 6 depicts a simplified block diagram 600 of an exemplary data structure for generating a route model 602 used by AM computing device 102 shown in FIG. 1. AM computing device 102 may retrieve data from memory and/or third party sources. AM computing device 102 may retrieve tasks 604 generated by task model 502. Tasks 604 may include information such as activity, location, and/or date and time. AM computing device 102 may retrieve mapping data 606 to analyze potential paths to generate routes for optimal travel plan 106 (shown in FIG. 1). Mapping data 606 may include paths, waypoints, and potential modes of transportation along the respective paths. AM computing device 102 may also retrieve third-party data 608 such as weather and traffic data.

In the exemplary embodiment, AM computing device 102 generates route model 602 based upon the retrieved data. AM computing device 102 executes route model 602 to generate routes for optimal travel plan 106. Route model 602 may include additional, less, or alternate functionality, including that discussed elsewhere herein.

Exemplary Computing Device

Figure 7:
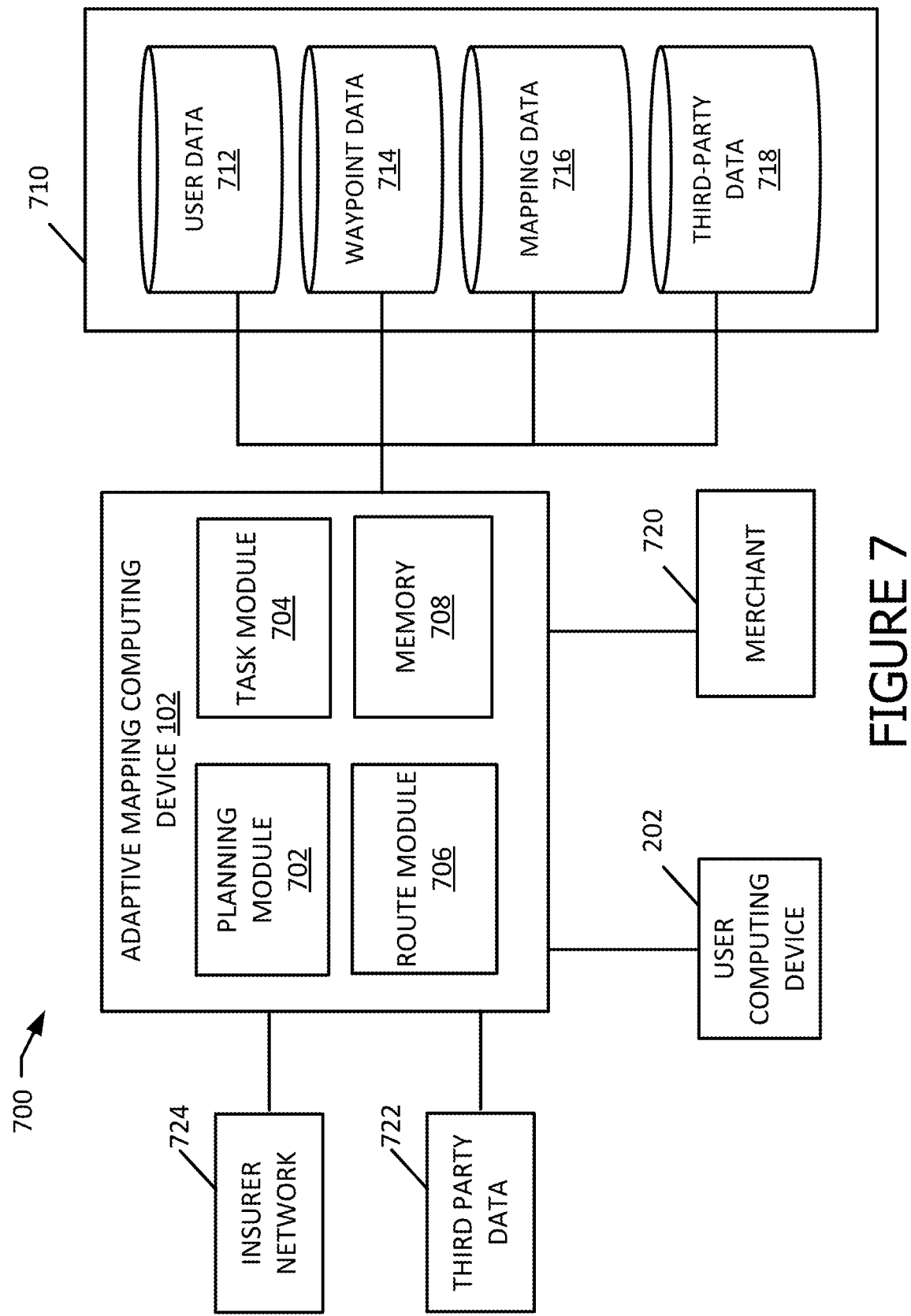
FIG. 7 depicts an exemplary configuration of an exemplary configuration of the computing device shown in FIG. 1.

FIG. 7 depicts an exemplary configuration 700 of an exemplary configuration of AM computing device 102 shown in FIG. 1. AM computing device 102 may include a planning module 702 for compiling, organizing, and presenting to a user computing device 202 generated optimal travel plans 106 (shown in FIG. 1). AM computing device 102 may also include a task module configured to generate task model 502 shown in FIG. 5. Task module 704 may be used to provide task information to route module 706 to generate route model 602 shown in FIG. 6. AM computing device 102 may include a memory 708. AM computing device 102 may include a processor for executing instructions. Instructions may be stored in memory area 708. AM computing device 102 may include one or more processing units (e.g., in a multi-core configuration).

In some embodiments, AM computing device 102 may be in direct communication with user computing device 202. In some embodiments, AM computing device 102 may be user computing device 202. As described above, AM computing device 102 is configured to display on user computing device 202 user interface 200 on user computing device 202. Also as described above, AM computing device 102 may be in communication with a merchant 720 and third-party data sources 722. In some embodiments, AM computing device may be in communication with an insurer network 724. Optimal travel plan 106 may include offers for insurance along the optimized routes and modes of transportation received from insurer network 724

AM computing device 102 may also be operatively coupled to a storage device 710. Storage device 710 may be any computer-operated hardware suitable for storing and/or retrieving data, such as, but not limited to, data associated with user data database 712, waypoint data database 714, mapping data database 716, and third-party data database 718.

In some embodiments, storage device 710 may be integrated in AM computing device 102. For example, AM computing device 102 may include one or more hard disk drives as storage device 710. In other embodiments, storage device 710 may be external to AM computing device 102 and may be accessed by a plurality of AM computing device 102. For example, storage device 710 may include a storage area network (SAN), a network attached storage (NAS) system, and/or multiple storage units such as hard disks and/or solid state disks in a redundant array of inexpensive disks (RAID) configuration.

In some embodiments, processor AM computing device 102 may be operatively coupled to storage device via a storage interface. The storage interface may be any component capable of providing AM computing device 102 with access to storage device 710. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing AM computing device 102 with access to storage device 710.

AM computing device 102 executes computer-executable instructions for implementing aspects of the disclosure. In some embodiments, AM computing device 102 may be transformed into a special purpose microprocessor by executing computer-executable instructions or by otherwise being programmed.

Exemplary User Computer Device

Figure 8:
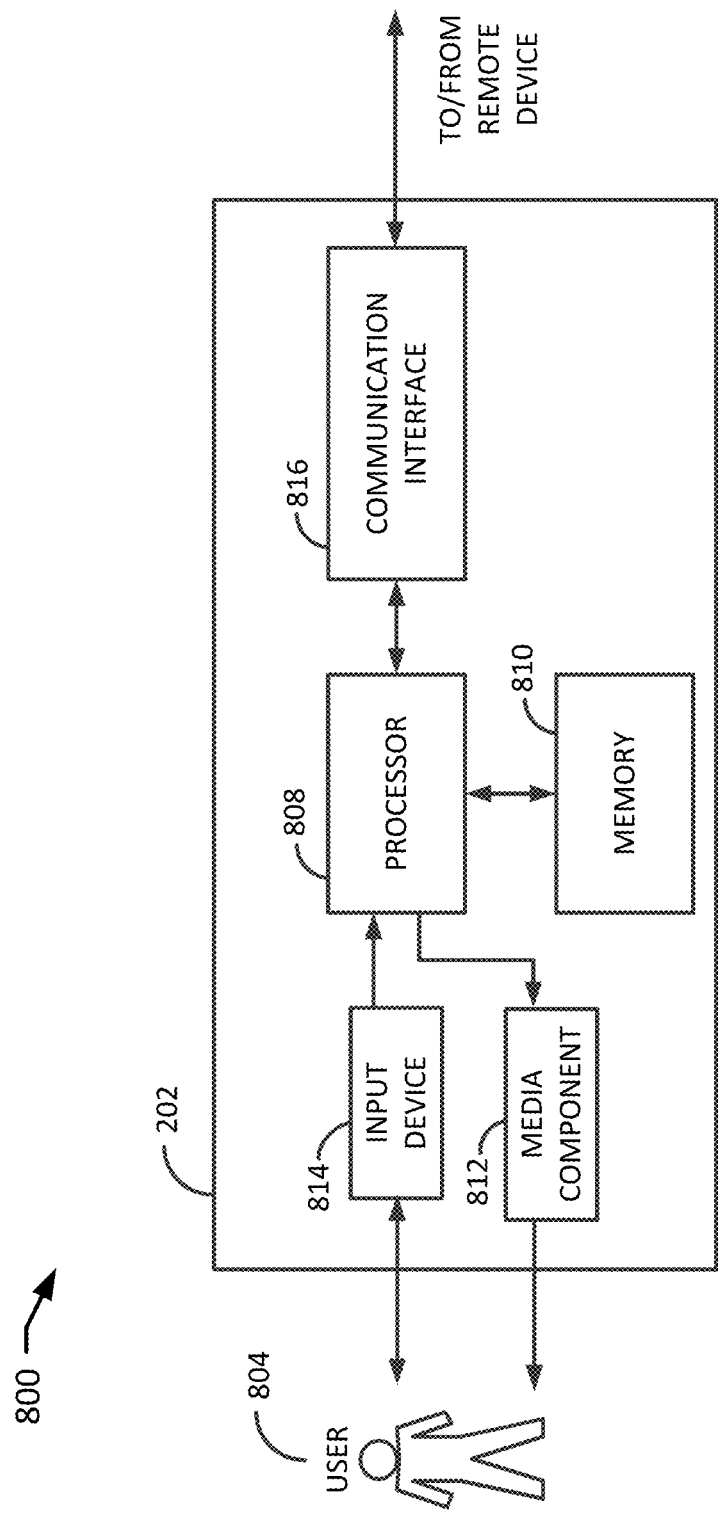
FIG. 8 illustrates an exemplary configuration of an exemplary user computing device.

FIG. 8 illustrates an exemplary configuration 800 of an exemplary user computing device 202. In some embodiments, user computing device 202 may be in communication with an adaptive mapping computing device (such as AM computing device 102, shown in FIG. 1). User computing device 202 may be a smartphone, tablet, smartwatch, wearable electronic, laptop, desktop, vehicle computing device, or another type of computing device associated with the account holder.

User computing device 202 may be operated by a user 104 to interact with AM computing device 102. User computing device 202 may receive input from user 104 via an input device 814. User computing device 202 includes a processor 808 for executing instructions. In some embodiments, executable instructions may be stored in a memory area 810. Processor 808 may include one or more processing units (e.g., in a multi-core configuration). Memory area 810 may be any device allowing information such as executable instructions and/or transaction data to be stored and retrieved. Memory area 810 may include one or more computer-readable media.

User computing device 202 also may include at least one media output component 812 for presenting information to user 804. Media output component 812 may be any component capable of conveying information to user 804. In some embodiments, media output component 812 may include an output adapter (not shown), such as a video adapter and/or an audio adapter. An output adapter may be operatively coupled to processor 808 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 812 may be configured to present a graphical user interface (e.g., a web browser and/or a client application) to user 804. A graphical user interface may include, for example, social insurance group activity, and/or a wallet application for managing payment information such as cash and/or cryptocurrency payment methods.

In some embodiments, user computing device 202 may include input device 814 for receiving input from user 804. User 804 may use input device 814 to, without limitation, interact with AM computing device 102 (e.g., using an app), or any of the computer devices discussed elsewhere herein. Input device 814 may include, for example, a keyboard, a pointing device, a mouse, a stylus, and/or a touch sensitive panel (e.g., a touch pad or a touch screen). A single component, such as a touch screen, may function as both an output device of media output component 812 and input device 814. User computing device 202 may further include at least one sensor, including, for example, a gyroscope, a position detector, a biometric input device, and/or an audio input device. In the exemplary embodiment, data collected by user computing device 202 may, but not limited to, include user data database 712 (shown in FIG. 7) and/or location data described elsewhere herein.

User computing device 202 may also include a communication interface 816, communicatively coupled to any of AM computing device 102, insurer network 724 (shown in FIG. 7), and third party data sources 722 (shown in FIG. 7). Communication interface 816 may include, for example, a wired or wireless network adapter and/or a wireless data transceiver for use with a mobile telecommunications network.

Stored in memory area 810 may be, for example, computer-readable instructions for providing user interface 200 (shown in FIG. 2) to user 104 via media output component 812 and, optionally, receiving and processing input from input device 814. The user interface may include, among other possibilities, a web browser, and/or a client application. Web browsers enable users, such as user 104, to display and interact with media and other information typically embedded on a web page or a website hosted by, for example, AM computing device 102.

A client application may allow user 104 to interact with, for example, any of AM computing device 102, insurer network 724, and/or third party data sources 722. For example, instructions may be stored by a cloud service and the output of the execution of the instructions sent to the media output component 812.

Exemplary Process for Generating Optimal Travel Plans

Figure 9:
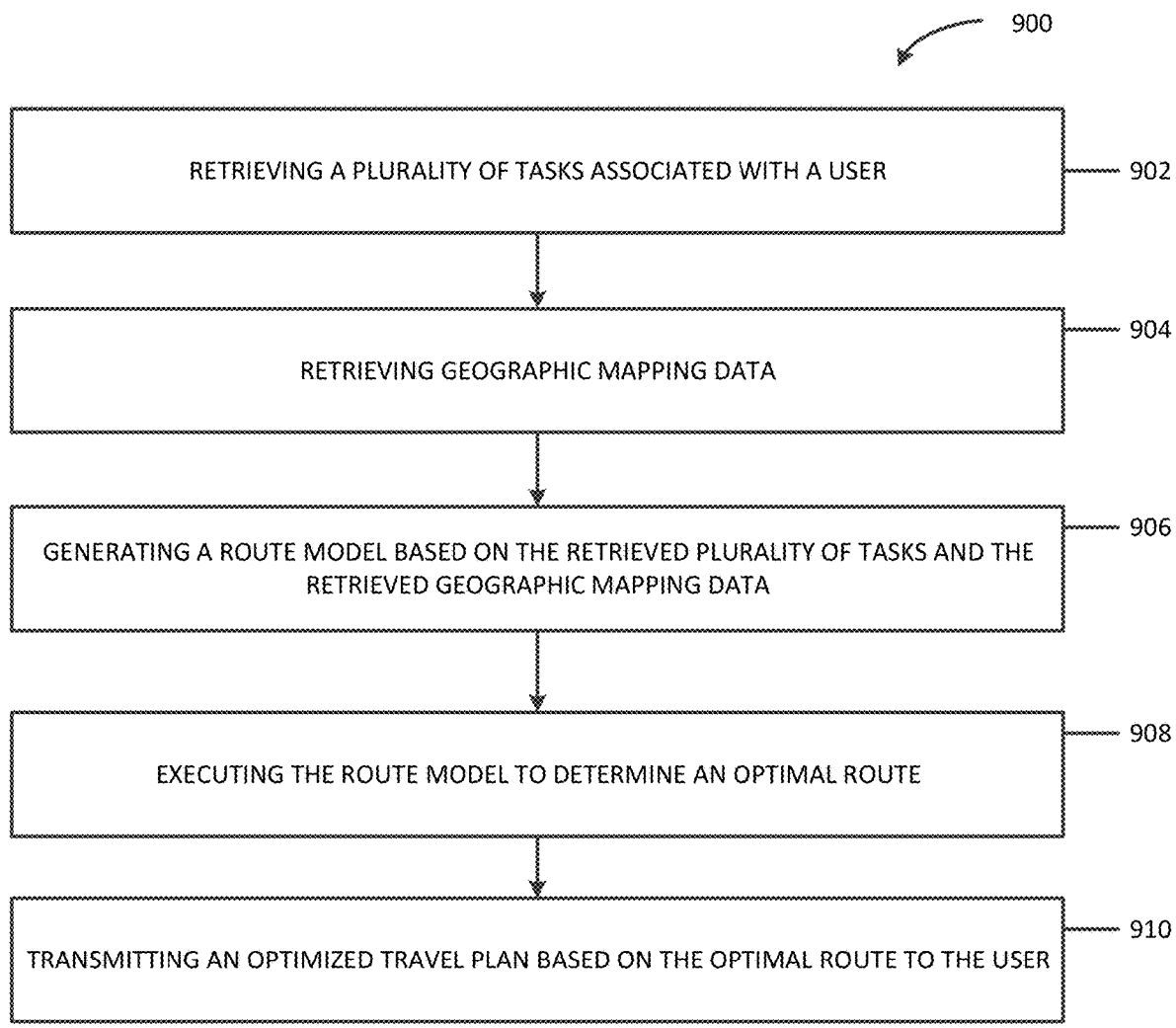
FIG. 9 illustrates a flow chart of an exemplary computer-implemented method for optimizing travel plans using the computing device shown in FIG. 1.

FIG. 9 illustrates a flow chart of an exemplary computer-implemented method 900 for generating an optimal travel plan using AM computing device 102 shown in FIG. 1. In the exemplary embodiment, AM computing device 102 may be in communication with user computing device 202 (shown in FIG. 2) to display user interface 200 (shown in FIG. 2).

In the exemplary embodiment, method 900 may include retrieving 902, from a memory, a plurality of tasks associated with a user. Method 900 may also include retrieving 904 geographic mapping data. Method 900 may further include generating 906 a route model based upon the retrieved plurality of tasks and the retrieved geographic mapping data. Method 900 may further include executing 908 the route model to determine an optimal route. Method 900 may also include transmitting 910 an optimized travel plan based upon the optimal route to the user. The computer systems discussed herein may include additional, less, or alternate functionality, including that discussed elsewhere herein.

Exemplary Embodiments and Functionality

In one aspect, an adaptive mapping (AM) computing device having at least one processor in communication with at least memory device may be provided. The at least one processor may be programmed to retrieve a plurality of tasks associated with a user. The at least one processor may also be programmed to retrieve geographic mapping data. The at least one processor may be further programmed to generate a route model based upon the retrieved plurality of tasks and the retrieved geographic mapping data. The at least one processor may be further programmed to execute the route model to determine an optimal route. The at least one processor may also be programmed to transmit, to the user, an optimized travel plan based upon the optimal route.

In one embodiment, the at least one processor may be further programmed to generate a task model associated with the user. The task model may be based upon one of tasks input by the user and predicted tasks determined from historical data associated with the user. The historical data may include previous tasks planned for the user.

In another embodiment, the at least one processor may be further programmed to retrieve relationship data including at least one relationship data point indicating a relationship and an activity recorded including a location, a date, and a time.

In further another embodiment, the optimal route includes at least one beginning waypoint and at least one destination waypoint. The at least one destination waypoint may be associated with at least one task of the plurality of tasks.

In yet another embedment, determining the optimal route may include at least comparing a first optimization parameter of a first route to a first optimization parameter of a second route.

In yet a further embodiment, the optimal route includes at least one path between a first waypoint and a second waypoint. The at least one processor may be programmed to transmit an offer for personal mobility policy insurance to the user.

In yet another embodiment, the at least one processor may be further programmed to generate a user interface including a visualization of the optimized travel plan.

Machine Learning & Other Matters

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, driver and/or vehicle, documents to be provided, the model being simulated, home owner and/or home, buyer, geolocation information, image data, home sensor data, and/or other data.

Based upon these analyses, the processing element may learn how to identify characteristics and patterns that may then be applied to training models, analyzing sensor data, authentication data, image data, mobile device data, and/or other data.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment," "exemplary embodiment," or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An adaptive mapping computing device comprising:
at least one processor in communication with at least one non-transitory memory device, wherein the at least one processor is configured to:
generate a route model based upon a plurality of tasks associated with a user, preferred modes of transportation of the user, and geographic mapping data including a starting location of the user;
execute the route model to determine an optimized travel plan for the user including an optimal route and one or more optimal modes of transportation for the optimal route;
receive, from a user computing device associated with the user, geolocation data of the user computing device indicating a real-time location of the user;
continuously receive and analyze real-time information from one or more data sources and the geolocation data from the user computing device to continuously update the optimized travel plan in real-time, thereby enabling the adaptive mapping computing device to perform, in real-time, continuous and adaptive route pathing and transportation mode selection based upon the real-time location of the user, fluctuating conditions, and merchant information associated with the plurality of tasks and a plurality of merchants;
retrieve and analyze the merchant information to select an optimal order of travel to each task location associated with the plurality of tasks, wherein analyzing the merchant information includes comparing (a) at least one of services or products offered by the plurality of merchants to the plurality of tasks, and (b) one or more locations of each of the plurality of merchants to the optimal order of travel;
transmit, to the user computing device, the updated optimized travel plan including the selected optimal order of travel;
provide a computer application configured to display, on a user interface of the user computing device, the updated optimized travel plan including the selected optimal order of travel; and
execute the computer application, wherein executing the computer application includes displaying the updated optimized travel plan including the selected optimal order of travel on the user interface of the user computing device.

2. The computing device of claim 1, wherein the plurality of tasks and the preferred modes of transportation, and the geographic mapping data are retrieved from at least one database.

3. The computing device of claim 1, wherein the at least one processor is further configured to execute the route model to determine the optimal route and the one or more optimal modes of transportation, the one or more optimal modes of transportation available at the starting location of the user.

4. The computing device of claim 1, wherein the real-time information includes at least one of real-time weather data or real-time traffic data.

5. The computing device of claim 1, wherein the at least one processor is further configured to:
provide the computer application configured to display, on the user interface of the user computing device, the updated optimized travel plan overlaid on a map.

6. The computing device of claim 1, wherein the at least one processor is further configured to generate the route model based upon traffic data and weather data.

7. The computing device of claim 1, wherein the at least one processor is further configured to:
generate a task model associated with the user, wherein the task model is based upon one of tasks input by the user and predicted tasks determined from historical data associated with the user, the historical data including previous tasks planned for the user; and generate the route model based upon risk data associated with at least one of the user or estimated routes associated with the plurality of tasks.

8. A computer-implemented method implemented by an adaptive mapping computing device having at least one processor in communication with at least one non-transitory memory device, the method comprising:
generating a route model based upon a plurality of tasks associated with a user, preferred modes of transportation of the user, and geographic mapping data including a starting location of the user;
executing the route model to determine an optimized travel plan for the user including and optimal route and one or more optimal modes of transportation for the optimal route;
receiving, from a user computing device associated with the user, geolocation data of the user computing device indicating a real-time location of the user;
continuously receiving and analyzing real-time information from one or more data sources and the geolocation data from the user computing device to continuously update the optimized travel plan in real-time, thereby enabling the adaptive mapping computing device to perform, in real-time, continuous and adaptive route pathing and transportation mode selection based upon the real-time location of the user, fluctuating conditions, and merchant information associated with the plurality of tasks and a plurality of merchants;
retrieving and analyzing the merchant information to select an optimal order of travel to each task location associated with the plurality of tasks, wherein analyzing the merchant information comprises comparing (a) at least one of services or products offered by the plurality of merchants to the plurality of tasks, and (b) one or more locations of each of the plurality of merchants to the optimal order of travel;
transmitting, to the user computing device, the updated optimized travel plan including the selected optimal order of travel;
providing a computer application configured to display, on a user interface of the user computing device, the updated optimized travel plan including the selected optimal order of travel; and
executing the computer application, wherein executing the computer application comprises displaying the updated optimized travel plan including the selected optimal order of travel on the user interface of the user computing device.

9. The computer-implemented method of claim 8, wherein the plurality of tasks and the preferred modes of transportation, and the geographic mapping data are retrieved from at least one database.

10. The computer-implemented method of claim 8 further comprising executing the route model to determine the optimal route and the one or more optimal modes of transportation, the one or more optimal modes of transportation available at the starting location of the user.

11. The computer-implemented method of claim 8, wherein the real-time information includes at least one of real-time weather data or real-time traffic data.

12. The computer-implemented method of claim 8 further comprising:
providing the computer application configured to display, on the user interface of the user computing device, the updated optimized travel plan overlaid on a map.

13. The computer-implemented method of claim 8 further comprising generating the route model based upon traffic data and weather data.

14. The computer-implemented method of claim 8 further comprising:
generating a task model associated with the user, wherein the task model is based upon one of tasks input by the user and predicted tasks determined from historical data associated with the user, the historical data including previous tasks planned for the user; and
generating the route model based upon risk data associated with at least one of the user or estimated routes associated with the plurality of tasks.

15. At least one non-transitory computer-readable storage medium having computer-executable instructions embodied thereon, wherein when executed by an adaptive mapping computing device having at least one processor in communication with at least one memory device, the computer-executable instructions cause the at least one processor to:
generate a route model based upon a plurality of tasks associated with a user, preferred modes of transportation of the user, and geographic mapping data including a starting location of the user;
execute the route model to determine an optimized travel plan for the user including and optimal route and one or more optimal modes of transportation for the optimal route;
receive, from a user computing device associated with the user, geolocation data of the user computing device indicating a real-time location of the user;
continuously receive and analyze real-time information from one or more data sources and the geolocation data from the user computing device to continuously update the optimized travel plan in real-time, thereby enabling the adaptive mapping computing device to perform, in real-time, continuous and adaptive route pathing and transportation mode selection based upon the real-time location of the user, fluctuating conditions, and merchant information associated with the plurality of tasks and a plurality of merchants;
retrieve and analyze the merchant information to select an optimal order of travel to each task location associated with the plurality of tasks, wherein analyzing the merchant information includes comparing (a) at least one of services or products offered by the plurality of merchants to the plurality of tasks, and (b) one or more locations of each of the plurality of merchants to the optimal order of travel;
transmit, to the user computing device, the updated optimized travel plan including the selected optimal order of travel;
provide a computer application configured to display, on a user interface of the user computing device, the updated optimized travel plan including the selected optimal order of travel; and
execute the computer application, wherein executing the computer application comprises displaying the updated optimized travel plan including the selected optimal order of travel on the user interface of the user computing device.

16. The at least one non-transitory computer-readable storage medium of claim 15, wherein the computer-executable instructions further cause the at least one processor to execute the route model to determine the optimal route and the one or more optimal modes of transportation, the one or more optimal modes of transportation available at the starting location of the user.

17. The at least one non-transitory computer-readable storage medium of claim 15, wherein the real-time information includes at least one of real-time weather data or real-time traffic data.

18. The at least one non-transitory computer-readable storage medium of claim 15, wherein the computer-executable instructions further cause the at least one processor to:
provide the computer application configured to display, on the user interface of the user computing device, the updated optimized travel plan overlaid on a map.

19. The at least one non-transitory computer-readable storage medium of claim 15, wherein the computer-executable instructions further cause the at least one processor to generate the route model based upon traffic data and weather data.

20. The at least one non-transitory computer-readable storage medium of claim 15, wherein the computer-executable instructions further cause the at least one processor to:
generate a task model associated with the user, wherein the task model is based upon one of tasks input by the user and predicted tasks determined from historical data associated with the user, the historical data including previous tasks planned for the user; and
generate the route model based upon risk data associated with at least one of the user or estimated routes associated with the plurality of tasks.

* * * * *